US008696165B2

(12) United States Patent
Cheng et al.

(10) Patent No.: US 8,696,165 B2
(45) Date of Patent: Apr. 15, 2014

(54) DYNAMIC MASK AND ILLUMINATION SYSTEM

(75) Inventors: Chuan-Te Cheng, Hsin-Chu (TW); Hui-Chen Lin, Hsin-Chu (TW)

(73) Assignee: Coretronic Corporation, Hsin-chu (TW)

( * ) Notice: Subject to any disclaimer, the term of this patent is extended or adjusted under 35 U.S.C. 154(b) by 1114 days.

(21) Appl. No.: 12/696,028

(22) Filed: Jan. 28, 2010

(65) Prior Publication Data

US 2010/0195325 A1 Aug. 5, 2010

(30) Foreign Application Priority Data

Feb. 3, 2009 (TW) ................................ 98103384 A

(51) Int. Cl.
F21S 8/00 (2006.01)
(52) U.S. Cl.
USPC ............ 362/277; 362/278; 362/279; 362/280; 362/285; 362/286; 362/235; 353/20; 353/38
(58) Field of Classification Search
USPC .......... 362/277, 278, 279, 235, 280, 284, 285, 362/286, 321, 322, 323, 324; 353/20, 38
See application file for complete search history.

(56) References Cited

U.S. PATENT DOCUMENTS

| 4,134,650 | A * | 1/1979 | Rosin ........................... 353/27 R |
| 4,839,685 | A * | 6/1989 | Ishiguro et al. ................ 396/111 |
| 6,520,662 | B1 * | 2/2003 | Dedoro ........................... 362/280 |
| 6,687,063 | B1 * | 2/2004 | Rasmussen et al. ........... 359/887 |
| 6,769,777 | B1 * | 8/2004 | Dubin et al. ..................... 353/97 |
| 2006/0092388 | A1 | 5/2006 | Liao et al. |
| 2007/0133208 | A1 * | 6/2007 | Smith et al. .................... 362/284 |
| 2008/0062546 | A1 | 3/2008 | Davis et al. |

FOREIGN PATENT DOCUMENTS

| CN | 101126891 | 2/2008 |
| JP | 2006-133736 | 5/2006 |
| JP | 2006-184433 | 7/2006 |
| TW | 200615675 | 5/2006 |
| TW | 200627051 | 8/2006 |
| TW | 200728890 | 8/2007 |

OTHER PUBLICATIONS

"First Office Action of China Counterpart Application", issued on May 25, 2011, p. 1-p. 5.
"Notice of Allowance of Taiwan counterpart application" issued on Nov. 29, 2012, p. 1-p. 4.
"Second Office Action of China Counterpart Application with English Translation", issued on Feb. 1, 2012, p. 1-p. 9.

* cited by examiner

Primary Examiner — Robert May
Assistant Examiner — Tsion Tumebo
(74) Attorney, Agent, or Firm — Jianq Chyun IP Office

(57) ABSTRACT

A dynamic mask adapted to an illumination system is provided. The illumination system includes at least one light source capable of emitting an illumination beam. The dynamic mask includes a board disposed in a transmission path of the illumination beam for adjusting a luminous flux of the illumination beam. The board has at least one strip-shaped opening. The strip-shaped opening has a first end and a second end opposite to the first end. The strip-shaped opening is mirror-symmetric with respect to a symmetrical axis, and the symmetrical axis is a straight line extending from the first end to the second end. A width of the strip-shaped opening increases from the first end to the second end, and the board is capable of moving along a direction parallel to the symmetrical axis. An illumination system using the dynamic mask is also provided.

18 Claims, 9 Drawing Sheets

DYNAMIC MASK AND ILLUMINATION SYSTEM

CROSS-REFERENCE TO RELATED APPLICATION

This application claims the priority benefit of Taiwan application serial no. 98103384, filed Feb. 3, 2009. The entirety of the above-mentioned patent application is hereby incorporated by reference herein and made a part of specification.

BACKGROUND OF THE INVENTION

1. Field of Invention

The invention relates to an optical mask and an illumination system. More particularly, the invention relates to an optical mask capable of adjusting the luminous flux and an illumination system.

2. Description of Related Art

Along with the advancement of technology, various types of display device distinct from the conventional cathode ray tubes are being heavily developed and promoted. These display devices include flat panel display devices such as, liquid crystal display (LCD), plasma display panel (PDP), organic light emitting diode (OLED), etc. Further, the projection types of display device, such as projectors, rear projection displays, etc. are also being heavily developed and promoted.

Currently the liquid crystal display and the plasma display panel have entered the mainstream and become the type of display device commonly used in daily life; however, a projection apparatus may provide a super-size screen (for example, greater than 52 inches) under a considerably lower cost. Hence, in the field of super-size display, the projection apparatuses remain un-replaceable. Further, as the fabrication technology continues to advance, the production of a projector gradually progresses in the direction of a lower cost and a lower price. Hence, the projection apparatus is applied in presentation in offices or in academy, the projection apparatus have also been extended to home theater system.

In the projection apparatus, an illumination system is adapted for providing illumination beam to illuminate a light valve. The light valve then converts the illumination beam into an image beam, and the image beam is projected by a projection lens on a screen to generate a screen image on screen. As the projection apparatus projects a completely black image, the light valve is unable to terminate all the lights to send to the lens and the screen. A basic brightness remains on the screen even with a completely black image. When the basic brightness is too high, the black image becomes not black enough. Hence, the contrast of the image picture projected by the projection apparatus decreases.

SUMMARY OF THE INVENTION

In view of the foregoing, the invention provides a dynamic mask capable of adjusting the luminous flux at a fast rate.

The invention also provides an illumination system capable of adjusting the luminous flux at a fast rate and the contrast of the image picture projected by the projection apparatus is enhanced.

The features and characteristics of the invention may be better understood by way of the following examples which are representative of the embodiments of the invention.

In one embodiment of the invention, a dynamic mask adapted to an illumination system is provided. The illumination system includes at least a light source, and the light source is capable of emitting an illumination beam. The dynamic mask includes a board, and the board is disposed in the transmission path of the illumination beam for adjusting a luminous flux of the illumination beam. The board includes at least a strip-shaped opening, and the strip-shaped opening has a first end and a second end. The strip-shaped opening is mirror-symmetric with respect to symmetric axis. The symmetrical axis is a straight line extending from the first end to the second end. A width of the strip-shaped opening incrementally increases from the first end to the second end. Further, the board is capable of moving along a direction parallel to the symmetric axis.

In another embodiment of the invention, an illumination system using the above-mentioned light source and dynamic mask is provided.

The embodiment or the embodiments of the invention may have at least one of the following advantages. In accordance to the dynamic mask and the illumination system using thereof in the exemplary embodiments of the invention, the board has a strip-shaped opening, the strip-shaped opening is mirror-symmetric with respect to a straight axis, the luminous flux of the illumination beam is adjusted by moving the board along a straight line. Accordingly, the time requirement for adjusting the luminous flux is reduced and the contrast of the image projected from the projection apparatus with the illumination system is effectively enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
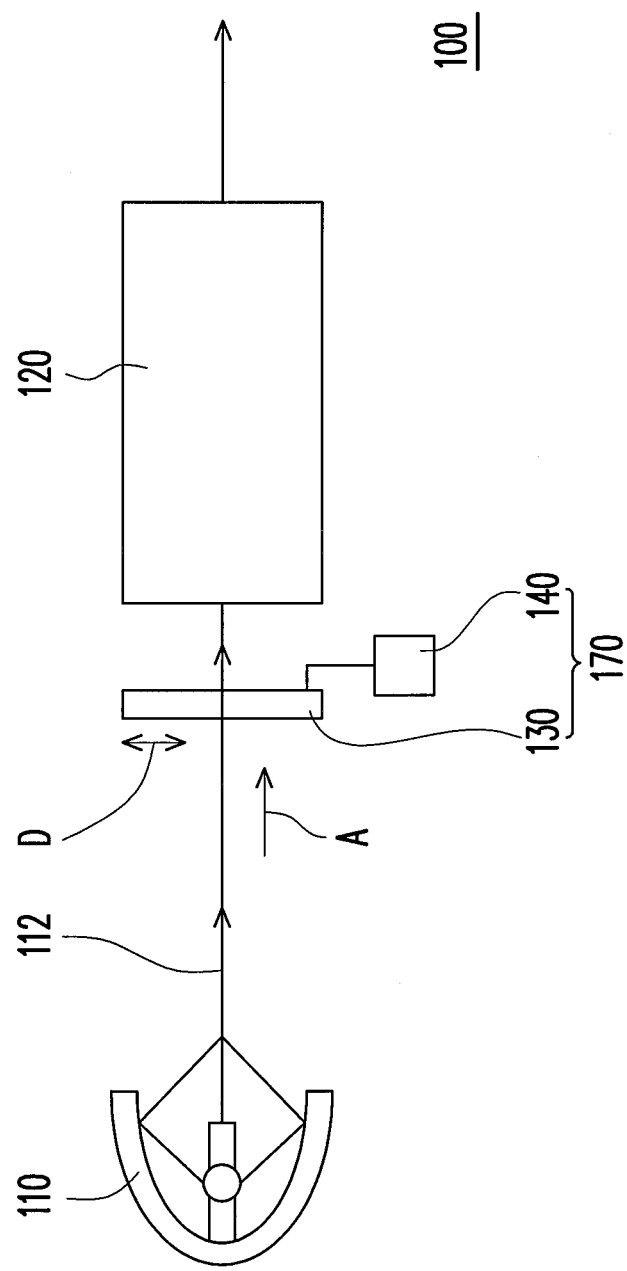
FIG. 1A is a schematic diagram illustrating a structure of an illumination system according to an embodiment of the invention.
Figure 1B:
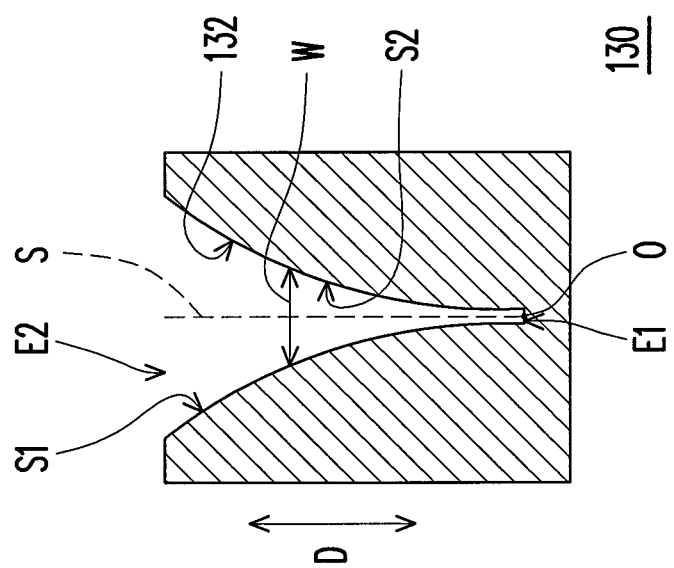
FIG. 1B is a top view of a board along the A direction in FIG. 1A.

FIG. 1A is a schematic diagram illustrating a structure of an illumination system according to an embodiment of the invention, while FIG. 1B is a top view of a board in FIG. 1A in the A direction. Referring to FIGS. 1A and 1B, the illumination system 100 of this embodiment of the invention includes a light source 110 and a dynamic mask 170. The light source 110 is adapted for emitting an illumination beam 112. In this embodiment of the invention, the light source 110 is, for example, an ultra high pressure lamp (UHP lamp). However, in other embodiments of the invention, the light source may include other appropriate light emitting devices. The dynamic mask 170 includes a board 130, and the board 130 is suitably disposed in the transmission path of the illumination beam 112 for adjusting a luminous flux of the illumination beam. In this embodiment of the invention, the board 130 is, for example, a metal board or a glass board sputtered with a photomask film. The board 130 includes a strip-shaped opening 132, and the strip-shaped opening 132 includes a first end E1 and a second end E2 opposite to the first end. The strip-shaped opening 132 is mirror-symmetric with respect to a symmetrical axis S. The symmetrical axis S is a straight line extending from the first end E1 to the second end E2. A width W of the strip-shaped opening 132 incrementally increases from the first end E1 to the second end E2. Further, the board 130 is adapted for moving in a direction D parallel to the symmetrical axis S. In this embodiment of the invention, the board 130 is actually perpendicular to an optical axis of the illumination beam 112, and the optical axis of the illumination beam 112 passes through the symmetrical axis S corresponding to the strip-shaped opening 132. The first end E1 of the strip-shaped opening 132 is, for example, a closed end, while the second end E2 is an opened end. In this embodiment of the invention, the illumination system 100 further includes a light homogenizing component 120 disposed in the transmission path of the illumination beam 112, and the board 130 is disposed between the light source 110 and the light homogenizing component 120 to homogenize the illumination beam 112. In this embodiment of the invention, the light homogenizing component 120 is, for example, a light integration rod. In other embodiments of the invention, other appropriate optical devices or mechanical components may be disposed around the end of the light homogenizing component 120 towards the board 130 (the light entry end) for the second end E2 of the strip-shaped opening 132 forming a closed end.

As the illumination beam 112 is emitted to the narrower portion of the width W of the striped-shape opening 132, the luminous flux of the illumination beam 112 of passing through the striped-shape opening 132 is lower and a higher ratio of the illumination beam 112 is blocked by the board 130. In contrast, as the illumination beam 112 is emitted to the wider portion of the width W of the striped-shape opening 132, the luminous flux of the illumination beam 112 of passing through the striped-shape opening 132 is higher and the ratio of the illumination beam 112 being blocked by the board 130 is lower. In other words, as the board 130 moves along the direction D such that the position of the striped-shape opening 112 aligns with the illumination beam 112 moves from the first end E1 to the second end E2, the luminous flux of the illumination beam 112 of passing through the board 130 incrementally increases. In one embodiment of the invention, the movement of the board 130 may driven by an actuator 140 connected to the board 130. The actuator 140 may include a motor (such as a stepping motor) or other appropriate actuators.

In this embodiment of the invention, the strip-shaped opening 132 includes a first side S1 and a corresponding second side S2. The first side S1 connects to the first end E1 and the second send E2, the second side S2 connects to the first end E1 and the second end E2, and the first side S1 and the second side S2 are mirror-symmetric with respect to the symmetrical axis S. A profile of the first side S1 is expressed by an approximation of a polynomial curve. In this embodiment, the highest power of a polynomial function corresponding to the polynomial curve is greater than or equal to 6, and the correlation coefficient of the profile of the first side S1 and this polynomial curve is greater than 0.8.

In this embodiment, the polynomial curve may be described as y=f(x), wherein f(x) is a polynomial function. An intersection between the first end E1 and the symmetrical axis S is defined as an original point O. A direction of extending from the original point O to the second end E2 along the symmetrical axis S is defined as the +x direction, and a direction of extending from the original point O, progressing along the first side S1, and perpendicular to the symmetrical axis S is defined as the +y direction. In this embodiment of the invention, for all even power terms of the polynomial function having powers greater than 1, the coefficients of all the even power terms having powers greater than 1 are less than zero, and the coefficients of all odd power terms of the polynomial function are greater than zero, and a constant of the polynomial function is greater than zero, and for all the terms having the power greater than or equal to one, an absolute value of each of the coefficients of all the terms of the polynomial function decreases as the power of the term increases for the first side S1 to form a smooth curve and to gradually depart from the symmetrical axis S. Two polynomial functions are presented below as examples. These exemplary examples are not intended to restrict the scope of this invention. It should be appreciated that this invention covers variations of the examples provided that they fall within the principles of this invention of applying a polynomial function with power greater or equal to 6 in designing the first side S1.

In one example, the polynomial function is described as follows:

$$f(x) = -2 \times 10^{-7} x^6 + 2 \times 10^{-5} x^5 - 0.0004 x^4 + 0.0053 x^3 - 0.0261 x^2 + 0.0752 x + 0.17 \quad (1)$$

Moreover, in this embodiment, the correlation coefficient $R^2$ of the first side S1 and equation 1 is, for example, 0.9999.

In another example, the polynomial function is described as follows:

$$f(x) = -4 \times 10^{-7} x^6 + 3 \times 10^{-5} x^5 - 0.0008 x^4 + 0.0097 x^3 - 0.0521 x^2 + 0.1184 x + 0.1182 \quad (2)$$

Moreover, in this example, the correlation coefficient $R^2$ of the first side S1 and equation (2) is, for example, 0.9987.

The features and characteristics of the invention now will be described more fully hereinafter with reference to a pair of comparative examples, wherein the board of the dynamic mask has a curved opening, the profile of the edge of the curved opening is an Archimedian spiral, and the profile of the edge may be described by the following polynomial function:

$$f(\theta) = a\theta \quad (3).$$

Wherein, a is a constant, and $\theta$ is a rotational angle of the board rotating about the geometric center of the curved opening. Moreover, the polar coordinates mathematic expression of equation (3) may be converted as:

$$f(x) = a'x \quad (4)$$

Wherein a' is a constant, and x may be view as the moving distance of the illumination beam with respect to the curved opening when the board is rotating.

Figure 2:
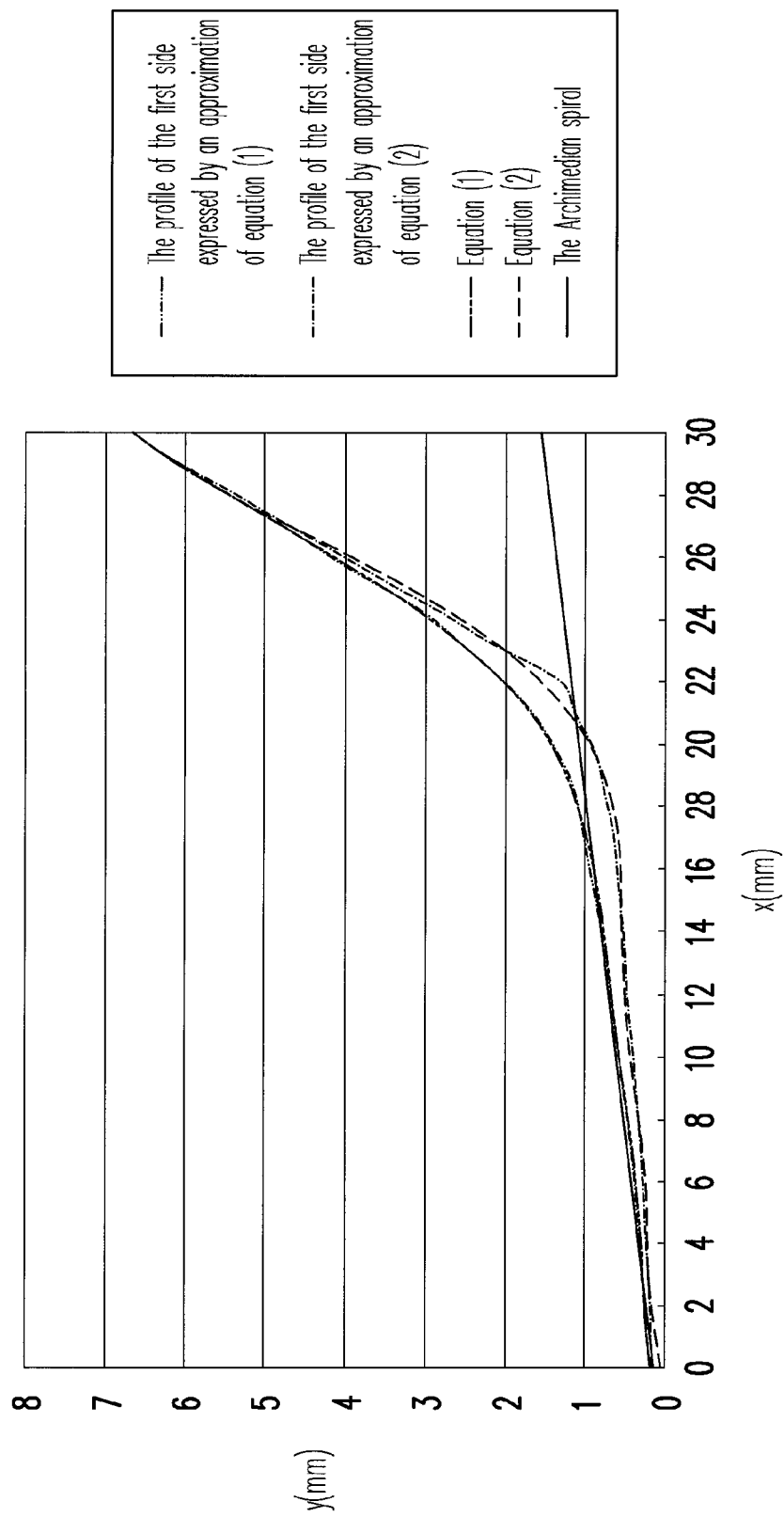
FIG. 2 is a curve diagram of the profile of the one side of the strip-shaped opening in FIG. 1B, a polynomial function that is used to approximate the profile of the side of the strip-shaped opening, and an Archimedian spiral.

FIG. 2 is a diagram of a curve depicted by the above equation (1), a curve of the profile of the first side expressed by an approximation of equation (1), a curve depicted by equation (2), a curve of the profile of the first side expressed by an approximation of equation (2), and a curve depicted by equation (4), wherein the vertical axis represents the y value (the polynomial value) and the horizontal axis represents the x value. As shown in FIG. 2, the curve depicted by equation (4) is a linear curve, while the slopes of the curves drawn depicted by equation (1) and equation (2) increases incrementally as the x value increases.

Figure 3:
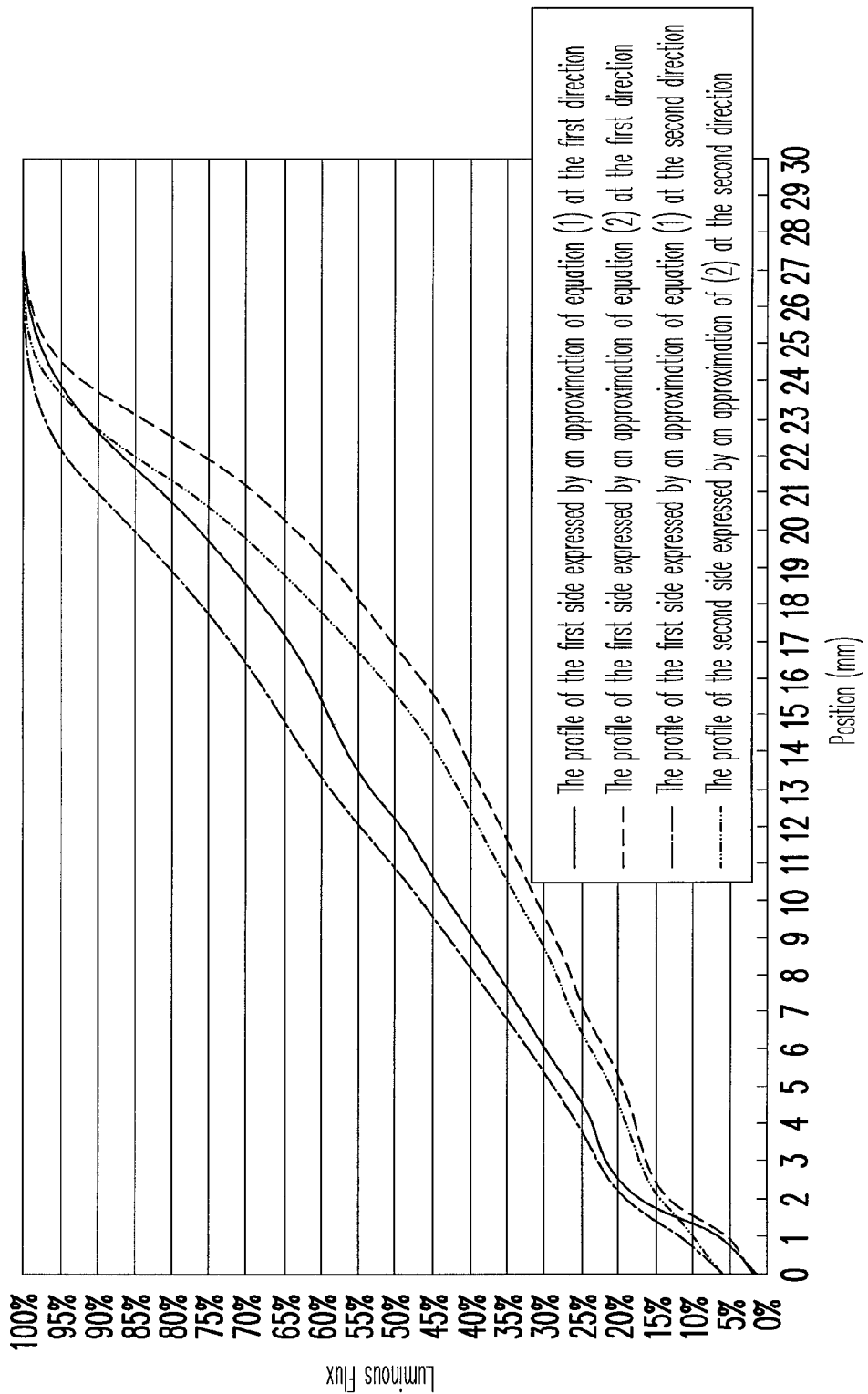
FIG. 3 is a curve diagram of the variation in the luminous flux of the illumination system in FIG. 1A.

Referring to FIGS. 1A and 1B, if the symmetrical axis S and the light homogenizing component 120 are respectively disposed in the first direction and the second direction and are perpendicular to each other, and the first direction and the second direction are both perpendicular to the optical axis of the illumination beam 112, the curve diagram of the variation in luminous flux is obtained as shown in FIG. 3, wherein the vertical axis represents the luminous flux of the illumination beam 112 of passing through the board 130, while the horizontal axis represents the position of the illumination beam 112 on the strip-shaped opening 132.

Figure 4:
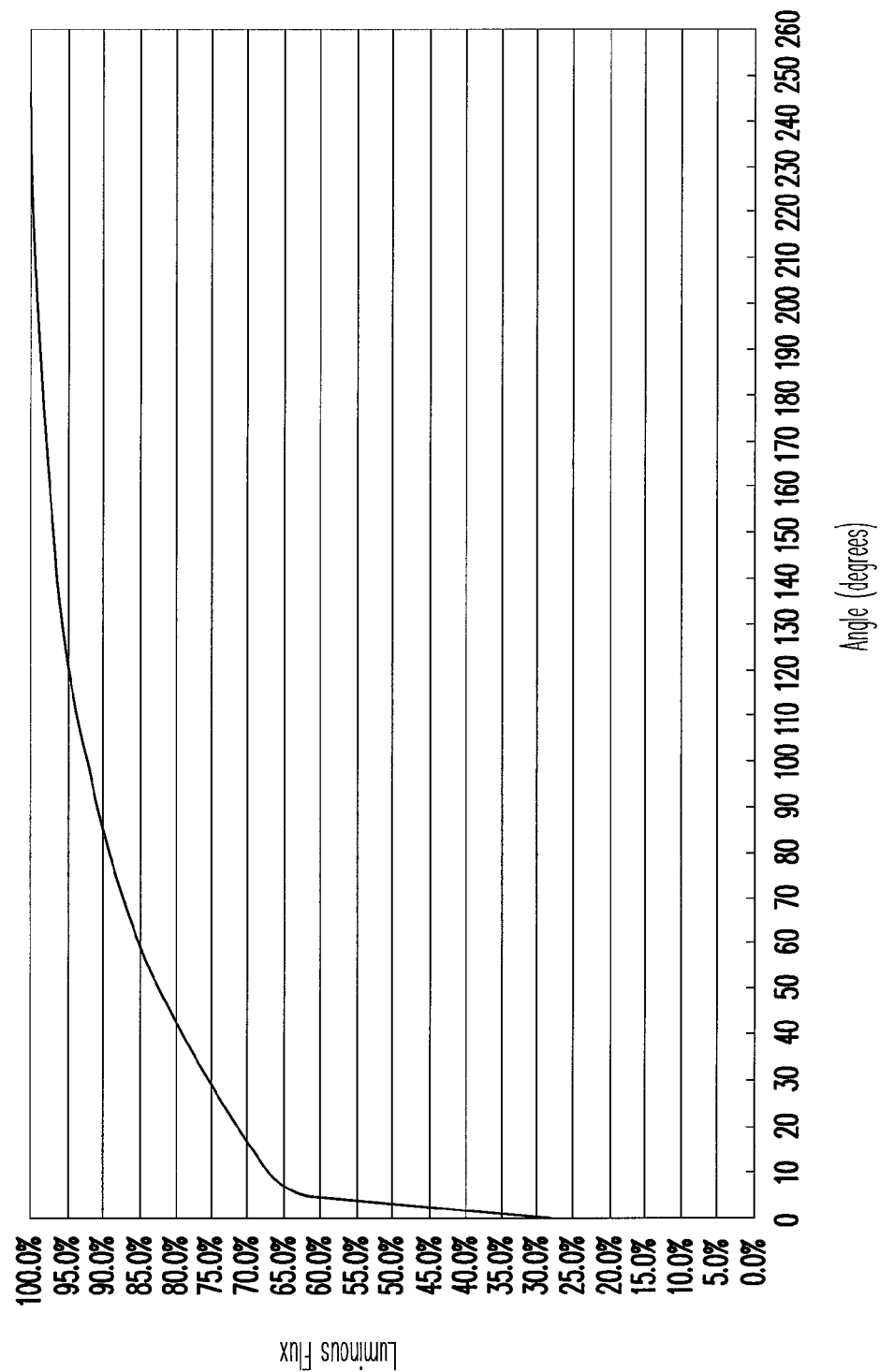
FIG. 4 is a curve diagram of the variation in the luminous flux obtained form a board having a curved opening with an Archimedian spiral edge.

Moreover, FIG. 3 represents a board having the curved opening with an edge of an Archimedian spiral, and a curve diagram presenting the change in the luminous flux of such a board is shown in FIG. 4, wherein the vertical axis represents the luminous flux of the illumination beam of passing through the board and the horizontal axis represents the rotational angle of the board. As shown in FIG. 4, when the rotational angle of the board having a curved opening with an Archimedian spiral edge is smaller, the luminous flux changes dramatically with a slight change in the rotational angle. Hence, as the user requires a small value of the luminous flux, it is difficult for the dynamic mask to accurately control the luminous flux to fall in such a value. In other words, when the dynamic mask is used to control the luminous flux to fall in a small value, the error becomes large. This type of dynamic mask is incompatible with the computing techniques of DynamicBlack™ by Texas Instruments Incorporated.

In comparison, from the curves as shown in FIG. 3 illustrating the variations in the luminous flux of the board 130 expressed by an approximation of the polynomial equation (1) and equation (2) in the above two exemplary embodiments of the invention, the luminous flux and the position of the illumination beam 112 of falling on the strip-shaped opening 132 have a linear relationship and a gamma curve relationship. In other words, when the position coordinates are smaller, the change in the luminous flux is also slower. Hence, as the user requires a small value of the luminous flux, the dynamic mask 170 of the embodiment of the invention is sufficiently capable of accurately adjusting the luminous flux to a particular value. Accordingly, the dynamic mask 170 of the embodiment of the invention is compatible with the computing techniques of DynamicBlack™ by Texas Instruments Incorporated, wherein the computing techniques of DynamicBlack™ is used to control the motion of the dynamic mask 170, that is to say, the computing techniques of DynamicBlack™ controls the moving position of the board 130.

As the board 130 moves to the first end E1 to align with the illumination beam 112, the luminous flux of the illumination beam 112 of passing through the board 130 is L1. As the board 130 moves to the second end E2 to align with the illumination beam 112, the luminous flux of the illumination beam 112 of passing through the board 130 is L2. In this embodiment of the invention, the dynamic mask satisfies 0<L1/L2<25%. Moreover, as the board 130 moves to the second end E2 to align with the illumination beam 112, the luminous flux of the illumination beam 112 of passing through the board 130 being L2 is the largest luminous flux of the illumination system 100 of the exemplary embodiment of the invention. Accordingly, when the illumination system 100 of the exemplary embodiments of the invention is applied in a projection apparatus and the algorithm provided by the control system of the projection apparatus (for example, the computing techniques of DynamicBlack™) is used to control the moving of the board 130, the contrast of an image picture projected from the projection apparatus increases at least 4 times. If the position of the board 130 is directly adjusted without applying the algorithm provided by the control system, the contrast of the image picture projected from the projection apparatus may increase up to 10 to 20 times. Accordingly, the illumination system 100 of the exemplary embodiments of the invention definitely enhances the contrast of an image picture (for example the dynamic image).

Moreover, the board 130 uses a strip-shaped opening 132 and not a curved opening with the Archimedian spiral edge, the dimension of the board 130 is smaller, the dimension of the dynamic mask 170 is correspondingly reduced to further scale down the dimension of the illumination system 100. Furthermore, the straight line provided by the strip-shaped opening 132 reduces the moving stroke of the board 130 to reduce to moving time of the board 130. Hence, the dynamic mask 170 of these embodiments of the invention is capable of rapidly adjusting the luminous flux to the finest condition according to the change in the image signal.

Figure 5A:
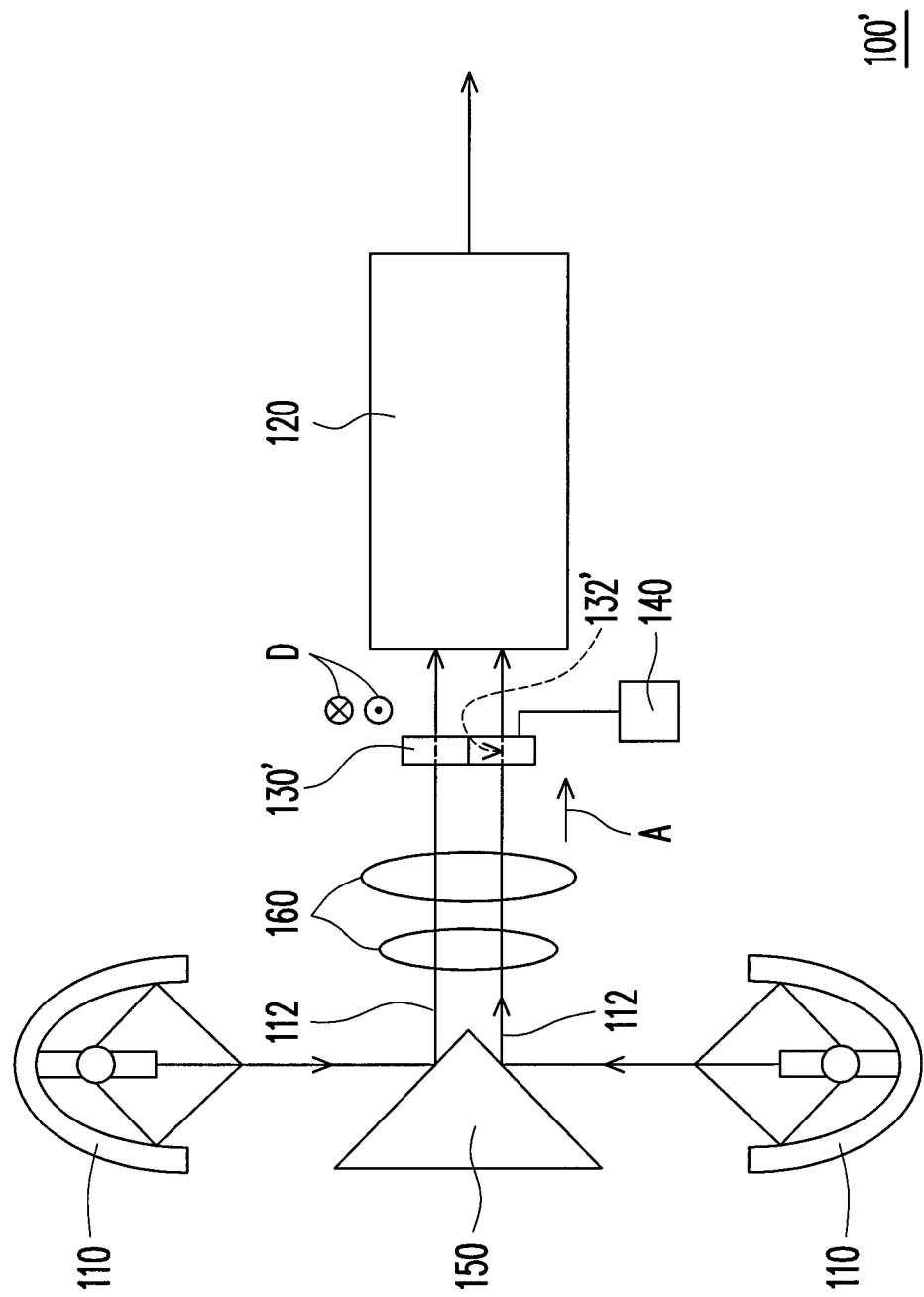
FIG. 5A is a schematic diagram illustrating a structure of an illumination system according to another embodiment of the invention.
Figure 5B:
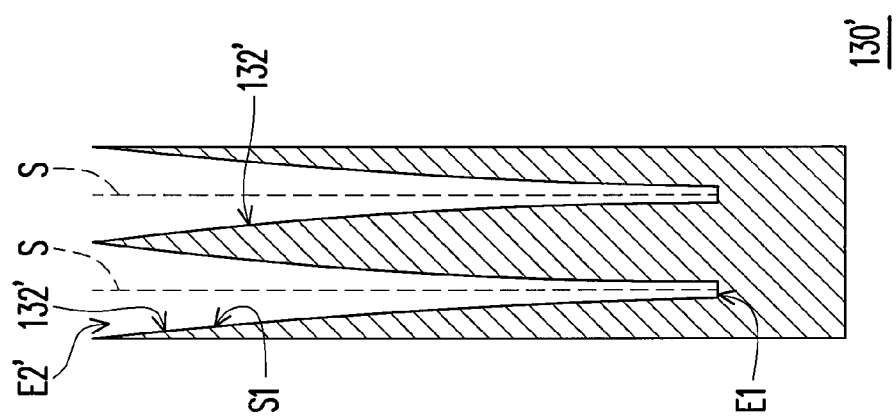
FIG. 5B is a top view of a board along the A direction in FIG. 5A.

FIG. 5A is a schematic diagram showing the structure of the illumination system according to another embodiment of the invention, while FIG. 5B is a top view of the board in FIG. 5A in the A direction. Referring to FIGS. 5A and 5B, the illumination system 100' in this embodiment is similar to the above-mentioned illumination system 100 (as shown in FIG. 1A); the difference between the two systems is presented as follows. The illumination system 100' of this exemplary embodiment of the invention includes two light sources 110, and the board 103' has two strip-shaped openings 132'. In this embodiment, the optical axes of the illumination beams 112 emitted from these light sources 110 respectively pass through the symmetrical axes S of these strip-shaped openings 132'. Moreover, in this embodiment, these illumination beams 112 emitted from these light sources 110 may be aligned by an optical combining device 150 and focused by lens 160, wherein the optical combining device 150 includes a prism, for example.

In this embodiment, these strip-shaped openings 132' are actually parallel to the symmetrical axes S. Further, in this embodiment of the invention, the second ends E2' of these strip-shaped openings 132' are adjacent to each other. An example of a polynomial function used to approximate the profile of the first side S1 of the strip-shaped opening 132' is presented as follows. The invention, however, should not be construed as limited to the examples set forth herein.

$$f(x) = -2 \times 10^{-7}x^6 + 10^{-5}x^5 - 0.0003x^4 + 0.003x^3 - 0.0126x^2 + 0.0477x + 0.1778 \quad \text{equation (5)}$$

Moreover, in this embodiment of the invention, the correlation coefficient $R^2$ of the first side S1 and equation (5) is, for example, 0.9994.

Figure 6:
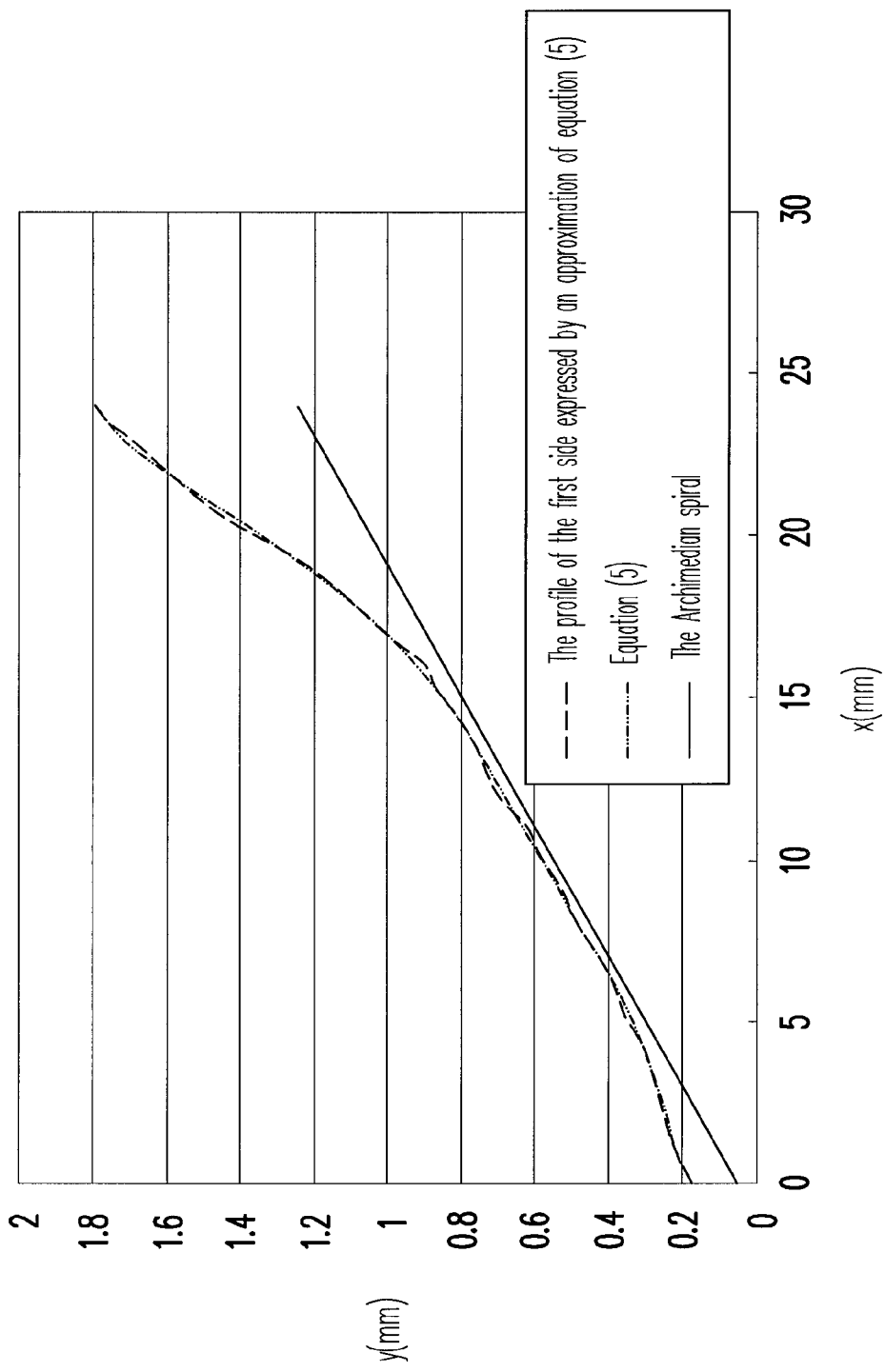
FIG. 6 a curve diagram of the profile of the one side of the strip-shaped opening in FIG. 5B, the polynomial function that is used to approximate the profile of the side of the strip-shaped opening, and an Archimedian spiral.
Figure 7:
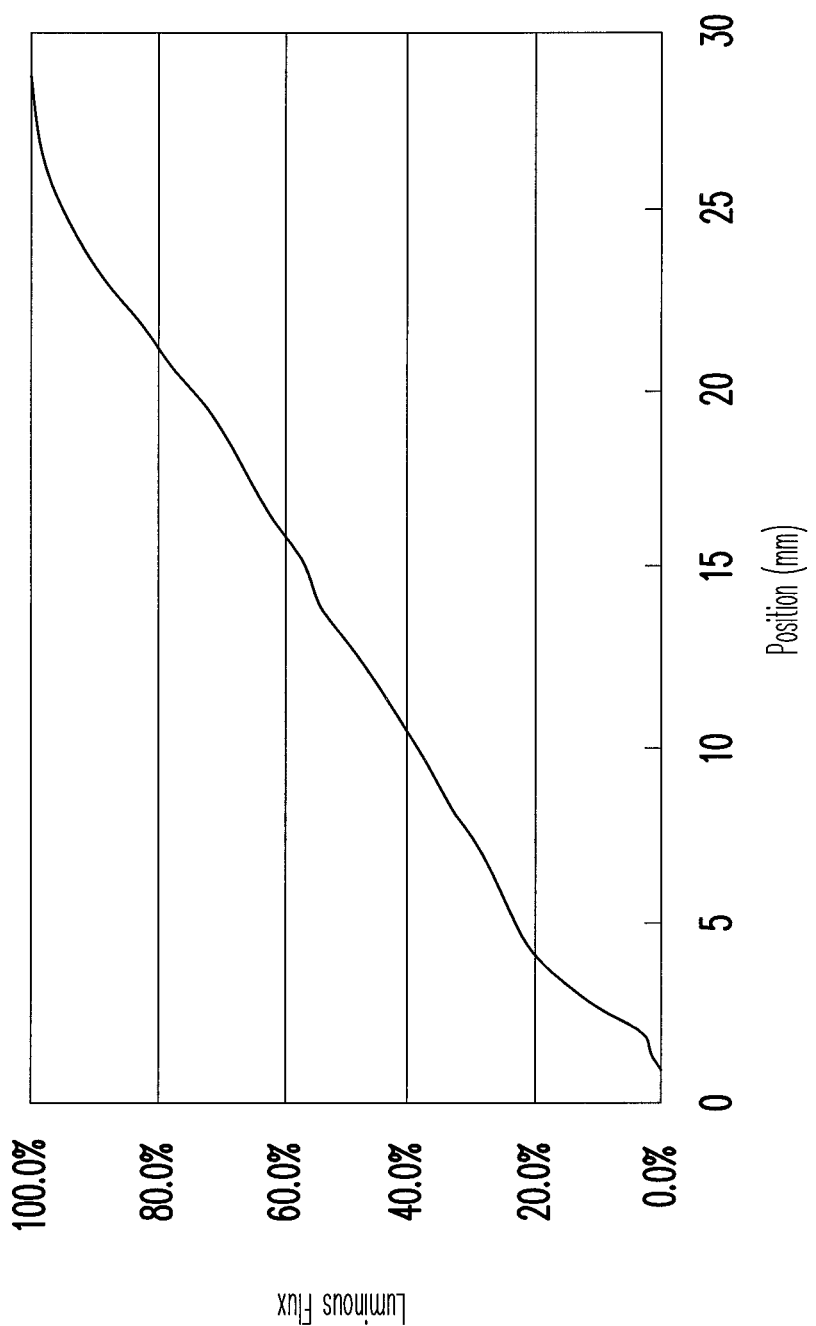
FIG. 7 is a curve diagram of the variation in the luminous flux of the illumination system in FIG. 5A.

FIG. 6 is a diagram of a curve depicted by the above equation (5), a curve of the profile of the first side S1 expressed by an approximation of equation (5), and a curve depicted by the above equation (4), wherein the vertical axis represents the y value (the polynomial value) and the horizontal axis represents the x value. FIG. 7 is a curve diagram of the variation in the luminous flux of the illumination beam of passing through the board 130', wherein the vertical axis represents the luminous flux of the illumination beam 112 of passing through the board 130' and the horizontal axis represents the position of the illumination beam 112 of falling on the strip-shaped opening 132. As shown in FIG. 7, the board 130' in the embodiment of the invention allows the luminous flux to be linearly proportion to the position. Hence, the board 130' also achieves the effects by the above-mentioned board 130 (as shown in FIG. 1B). Moreover, since the board 130' has two strip-shaped openings 132', the board 130's is adaptable for an illumination system 100' having two light sources 110 (a dual lamp illumination system). It is because when a single opening board is applied in a dual lamp illumination system, the strip-shaped opening is unable to align with the most intense portion of the light intensity distribution of the two illumination beams respectively generated by the two light sources. This situation is often occurred at the one end where the illumination beam illuminates the strip-shaped opening with a smaller width. However, in accordance to this embodiment of the invention, using two strip-shaped openings 132' to respectively align with two illumination beams 112 may obviate the above problems.

Moreover, as the board 130' moves to the first ends E1 of these strip-shaped openings 132' to respectively align with the illumination beams 112, the luminous flux of these illumination beams 112 of passing through the board 130' are L1; and as the board 130' moves to the second ends E2' of these strip-shaped openings 132' to respectively align with these illumination beams 112, the luminous flux of these illumination beams 112 of passing through the board 130' are L2. In this embodiment of the invention, the illumination system 100' satisfies 0<L1/L2<25%, and L2 is the largest luminous flux of the illumination system 100'. The illumination system 100' provides similar advantages and effects as the illumination system 100 and will not further reiterate herein.

It is worthy to note that the illumination system of the invention is not limited to include one or two light sources. The board of the invention is also not limited to include just one or two strip-shaped openings. In other embodiments of the invention, the illumination system may include three or more light sources and the board may include three or more strip-shaped openings. Further, according to an embodiment of the invention, as the illumination system includes four light sources, an optical combining device may be used to combine the four illumination beams into two illumination beams. Hence, a board with two strip-shaped openings still applicable for adjusting the luminous flux.

The embodiment or the embodiments of the invention may have at least one of the following advantages. In accordance to the above, with the dynamic mask and the illumination system using thereof of the exemplary embodiments of the invention, the luminous flux and the position of the illumination beam of falling on the strip-shaped opening have a linear relationship or a gamma curve relationship since the edge of the strip-shaped opening of board may be described with a polynomial function having power greater or equal to 6. In other words, when the position coordinates value is smaller, the change in the luminous flux also becomes slower. Accordingly, as the user requires a small value of the luminous flux, the dynamic mask and the lamination system of the embodiments of the invention are sufficiently capable to accurately adjust the luminous flux to a particular value.

Since the luminous flux and the position of the illumination beam of falling on the strip-shaped opening have a linear relationship and a gamma curve relationship, the contrast of the image picture (for example the dynamic image on screen) projected from the projection apparatus increases when the illumination system of the exemplary embodiments of the invention is applied in a projection apparatus with the algorithm provided by the control system of the projection apparatus to control the moving of the board.

Further, since the board in the exemplary embodiments of the invention employs a strip-shaped opening rather than a curved opening with an Archimedian spiral edge, the dimension of the board is smaller, and the dimension of the dynamic mask is correspondingly reduced to further scale down the dimension of the illumination system. Furthermore, the straight line provided by the strip-shaped opening reduces the moving stroke of the board 130; thus, the moving time of the board is reduced. Hence, the dynamic mask and the illumination system of the embodiment of the invention are capable of rapidly adjusting the luminous flux to the finest condition in accordance to the change in the image signal. Moreover, in the illumination system of the exemplary embodiments of the invention, since the board may include a plurality of strip-shaped openings, the board is adaptable for an illumination system having a plurality of light sources.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A dynamic mask, adapted to an illumination system, the illumination system comprising at least one light source capable of emitting an illumination beam, the dynamic mask comprising:

a board, adapted to be disposed in a transmission path of the illumination beam for adjusting a luminous flux of the illumination beam, wherein the board comprises at least one strip-shaped opening and the at least one strip-shaped opening comprises a first end and a corresponding second end, the at least one strip-shaped opening is minor-symmetric with respect to a symmetrical axis, the symmetrical axis is a straight line extending from the first end to the second end, a width of the at least one strip-shaped opening incrementally increases from the first end to the second end, and the board is capable of moving in a direction parallel with the symmetrical axis, wherein the strip-shaped opening comprises a first side and a corresponding second side, the first side connects to the first end and the second end, the second side connects to the first end and the second end, the first side and the second side are minor-symmetric with respect to the symmetrical axis, and a profile of the first side is expressed by an approximation of a polynomial curve, and wherein the polynomial curve is described as $y=f(x)$, wherein $f(x)$ is a polynomial function and an intersection between the first end and the symmetrical axis is defined as an original point, and a direction of extending from the original point to the second end along the symmetrical axis is defined as a $+x$ direction, and a direction of extending from the original point, progressing along the first side, and perpendicular to the symmetrical axis is defined as a $+y$ direction, wherein the half of the width of the at least one strip-shaped opening is less than the distance from the original point to the second end corresponding with the polynomial curve function.

2. The dynamic mask of claim 1, wherein a highest power of the polynomial function corresponding to the polynomial curve is greater or equal to 6, and a correlation coefficient of the profile of the first side and the polynomial curve is greater than 0.8.

3. The dynamic mask of claim 2, wherein, all even power terms of the polynomial function have powers greater than 1, coefficients thereof are less than zero, and coefficients of all odd power terms of the polynomial function are greater than zero, and a constant of the polynomial function is greater than zero, and for all the terms having the power greater than or equal to one, an absolute value of each of the coefficients of all the terms of the polynomial function decreases as the power of the term increases.

4. The dynamic mask of claim 1, wherein the board is adapted to be perpendicular to an optical axis of the illumination beam.

5. The dynamic mask of claim 1, wherein as the board is capable of moving to the first end to align with the illumination beam, the luminous flux of the illumination beam of passing through the board is L1, and as the board is capable of moving to the second end to align with the illumination beam, the luminous flux of the illumination beam of passing through the board is L2, wherein $0<L1/L2<25\%$.

6. The dynamic mask of claim 1, wherein an optical axis of the illumination beam is capable of passing through the symmetrical axis.

7. The dynamic mask of claim 1, wherein the first end is a closed end and the second end is an open end.

8. The dynamic mask of claim 1, wherein the at least one light source comprises two light sources, the at least one strip-shaped opening comprises two stripe-shaped openings, and optical axes of the illumination beams emitted from the two light sources are respectively capable of passing through the symmetrical axes corresponding to the two stripe-shaped openings.

9. The dynamic mask of claim 8, wherein the symmetrical axes are substantially parallel to each other.

10. The dynamic mask of claim 8, wherein the second ends of the two striped-shape openings are adjacent to each other.

11. The dynamic mask of claim 8, wherein as the board is capable of moving to the first ends to respectively align with the illumination beam, the luminous flux of the illumination beams of passing through the board are L1, and as the board is capable of moving to the second ends to align with the illumination beams, the luminous flux of the illumination beams of passing through the board is L2, wherein $0<L1/L2<25\%$.

12. The dynamic mask of claim 1, further comprising an actuator connected to the board for driving the board to move.

13. An illumination system, comprising:
at least one light source, capable of emitting an illumination beam; and
a dynamic mask, comprising:

a board, adapted to be disposed in a transmission path of the illumination beam for adjusting a luminous flux of the illumination beam, wherein the board comprises at least one strip-shaped opening and the at least one strip-shaped opening comprises a first end and a corresponding second end, the at least one strip-shaped opening is minor-symmetric with respect to a symmetrical axis, the symmetrical axis is a straight line extending from the first end to the second end, a width of the at least one strip-shaped opening incrementally increases from the first end to the second end, and the board is capable of moving in a direction parallel to the symmetrical axis, wherein the strip-shaped opening comprises a first side and a corresponding second side, the first side connects to the first end and the second end, the second side connects to the first end and the second end, the first side and the second side are mirror-symmetric with respect to the symmetrical axis, a profile of the first side is expressed by an approximation of a polynomial curve, and wherein the polynomial curve is described as $y=f(x)$, wherein $f(x)$ is a polynomial function and an intersection between the first end and the symmetrical axis is defined as an original point, and a direction of extending from the original point to the second end along the symmetrical axis is defined as a $+x$ direction, and a direction of extending from the original point, progressing along the first side, and perpendicular to the symmetrical axis is defined as a $+y$ direction, wherein the half of the width of the at least one strip-shaped opening is less than the distance from the original point to the second end corresponding with the polynomial curve function.

14. The illumination system of claim 13, wherein a highest power of the polynomial function corresponding to the polynomial curve is greater or equal to 6, and a correlation coefficient of the profile of the first side and the polynomial curve is greater than 0.8.

15. The dynamic mask of claim 13, wherein all even power terms of the polynomial function have powers greater than 1, coefficients thereof are less than zero, and coefficients of all odd power terms of the polynomial function are greater than zero, and a constant of the polynomial function is greater than zero, and for all the terms having the power greater than or equal to one, an absolute value of each of the coefficients of all the terms of the polynomial function decreases as the power of the term increases.

16. The dynamic mask of claim 13, wherein as the board is capable of moving to the first end to align with the illumination beam, the luminous flux of the illumination beam of passing through the board is L1, and as the board is capable of moving to the second end to align with the illumination beam, the luminous flux of the illumination beam of passing through the board is L2, wherein 0<L1/L2<25%.

17. The illumination system of claim 13 further comprising a light homogenizing component disposed in the transmission path of the illumination beam, wherein the board is disposed between the light source and the light homogenizing component.

18. The illumination system of claim 13, wherein the at least one light source comprises two light sources, the at least one strip-shaped opening comprises two stripe-shaped openings, and optical axes of the illumination beams emitted from the two light sources are respectively capable of passing through the symmetrical axes corresponding to the two stripe-shaped openings.

* * * * *